(12) United States Patent
Zange et al.

(10) Patent No.: US 7,382,846 B1
(45) Date of Patent: Jun. 3, 2008

(54) OFF-SYMBOL CORRELATION TECHNIQUE

(75) Inventors: Daniel M. Zange, Robins, IA (US);
Michael N. Newhouse, Cedar Rapids, IA (US); Robert J. Frank, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 758 days.

(21) Appl. No.: 10/953,224

(22) Filed: Sep. 29, 2004

(51) Int. Cl.
*H04L 7/00* (2006.01)
*H04L 7/06* (2006.01)

(52) U.S. Cl. .................. 375/365; 375/354; 375/362; 375/363; 375/364

(58) Field of Classification Search ............... 375/354, 375/365, 367, 366, 368, 362, 134, 293, 294
See application file for complete search history.

(56) References Cited

U.S. PATENT DOCUMENTS

| | | | | |
|---|---|---|---|---|
| 5,023,940 | A * | 6/1991 | Johnson et al. | 455/212 |
| 5,276,706 | A * | 1/1994 | Critchlow | 375/343 |
| 2004/0096012 | A1* | 5/2004 | Yang | 375/308 |

* cited by examiner

*Primary Examiner*—David C. Payne
*Assistant Examiner*—Linda Wong
(74) *Attorney, Agent, or Firm*—Nathan O. Jensen; Kyle Eppele

(57) ABSTRACT

A method of correlating a signal to a synchronization pattern is disclosed. The signal has a waveform with frequency and phase angle components that may be varied, at each repeated signal pulse, to communicate a change in a bit pattern of the signal. A synchronization pattern is generated using knowledge of phase rotation direction due to two consecutive bits in a synchronization key. The signal is compared with the synchronization pattern. It is determined whether the comparison of the signal and the synchronization pattern indicate a correlation between the signal and the synchronization pattern.

11 Claims, 7 Drawing Sheets

OFF-SYMBOL CORRELATION TECHNIQUE

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract No. F33615-01-C-1856 awarded by DARPA.

FIELD OF THE INVENTION

The invention relates to communications technology, and more particularly, to the correlation of wireless signals to known synchronization patterns.

BACKGROUND OF THE INVENTION

Minimum Shift Keying (MSK) is a communications protocol that is commonly used to communicate data in communications networks. MSK uses continuous phase modulation techniques to communicate the required data. One aspect of processing received signals involves acquisition and estimation of the signal in time, phase, frequency, and signal quality. The acquisition is often performed using correlation techniques. The correlation techniques attempt to compare any incoming signals with a synchronization pattern known to both a transmitter and a receiver. The transmitter inserts the known synchronization pattern into the transmitted signal. The receiver uses this pattern to perform the acquisition and estimation of the incoming signal.

Often, a signal is represented using in-phase and quadrature components of the received signal to assist in processing. FIG. 2 shows how the quadrature or phase angle component 30 of an MSK signal changes in response to an on/off bit pattern 32. It can be seen that a change in the bit pattern results in an immediate reversal in direction of the phase rotation (frequency). One drawback to using an MSK strategy is that frequency changes, such as at 34, provide possible discontinuities that result in wide bandwidth frequency events thus giving up spectral efficiency.

Gaussian Minimum Shift Keying (GMSK) provides at least a partial solution to the frequency discontinuities inherent in MSK techniques. As shown at reference number 38 in FIG. 3, GMSK techniques round off or smooth each phase change such that the phase change does not yield sudden shifts in frequency ($d\phi/dt$). However, because of the rounding off of the signal, GMSK techniques suffer from inherent intersymbol interference. FIG. 4 depicts "eye diagrams" for the in-phase and quadrature components of an ideal MSK signal 40. The best point to sample the signal for correlation purposes is the point 42 at which MSK eye diagram 40 is widest. This is when the phase angle is at 90 degrees and integer multiples thereof, and corresponds to the times when the on/off bit pattern can change from a +1 value to a −1 value. However, the eye diagrams for a the in-phase and quadrature components of a GMSK signal 44, as represented in FIGS. 5A and 5B, show that at phase angles ideal for MSK signals (at point 46), the ideal GMSK signal does not provide a predictable maximum opening or predictable phase. This demonstrates that GMSK signals are inherently susceptible to intersymbol interference at the phase angles of 0, 90, 180, and 270 degrees, said interference being usually in the neighborhood of 2-3 dB. Consequently, when a GMSK signal is correlated at the same phase angles as MSK signals, correlation computations may be adversely affected.

It is therefore an object of the invention to provide a method of correlating signals having in-phase and quadrature components.

It is also an object of the invention to provide a method of correlating such signals while minimizing the effects of intersymbol interference.

A feature of the invention is using knowledge of direction of phase rotation due to two consecutive bits in a known synchronization key to create a correlator synchronization pattern.

An advantage of the invention is the effective elimination of intersymbol interference while simplifying the computation required by a correlator function.

SUMMARY OF THE INVENTION

The invention provides a method of correlating a signal to a synchronization pattern. The signal has a waveform with frequency and phase angle components that may be varied, at each repeated signal pulse, to communicate a change in a bit pattern of the signal. A synchronization pattern is generated using knowledge of phase rotation direction due to two consecutive bits in a synchronization key. The signal is compared with the synchronization pattern. It is determined whether the comparison of the signal and the synchronization pattern indicate a correlation between the signal and the synchronization pattern.

The invention also provides a correlator that correlates a signal to a synchronization pattern. The signal has a waveform with frequency and phase angle components that may be varied, at each repeated signal pulse, to communicate a change in a bit pattern of the signal. Means are provided for generating a synchronization pattern using knowledge of phase rotation direction due to two consecutive bits in a synchronization key. Means are provided for comparing the signal with the synchronization pattern. Means are provided for determining whether the comparison of the signal and the synchronization pattern indicate a correlation between the signal and the synchronization pattern.

The invention further provides a method of correlating a signal to a synchronization pattern. The signal has a Continuous Phase Modulation (CPM) waveform with frequency and phase angle components that may be varied, at each repeated signal pulse, to communicate a change in a bit pattern of the signal. A synchronization pattern is generated using knowledge of phase rotation direction due to two consecutive bits in a synchronization key. The signal is compared with the synchronization pattern. It is determined whether the comparison of the signal and the synchronization pattern indicate a correlation between the signal and the synchronization pattern.

DETAILED DESCRIPTION OF THE DRAWINGS

Figure 1:
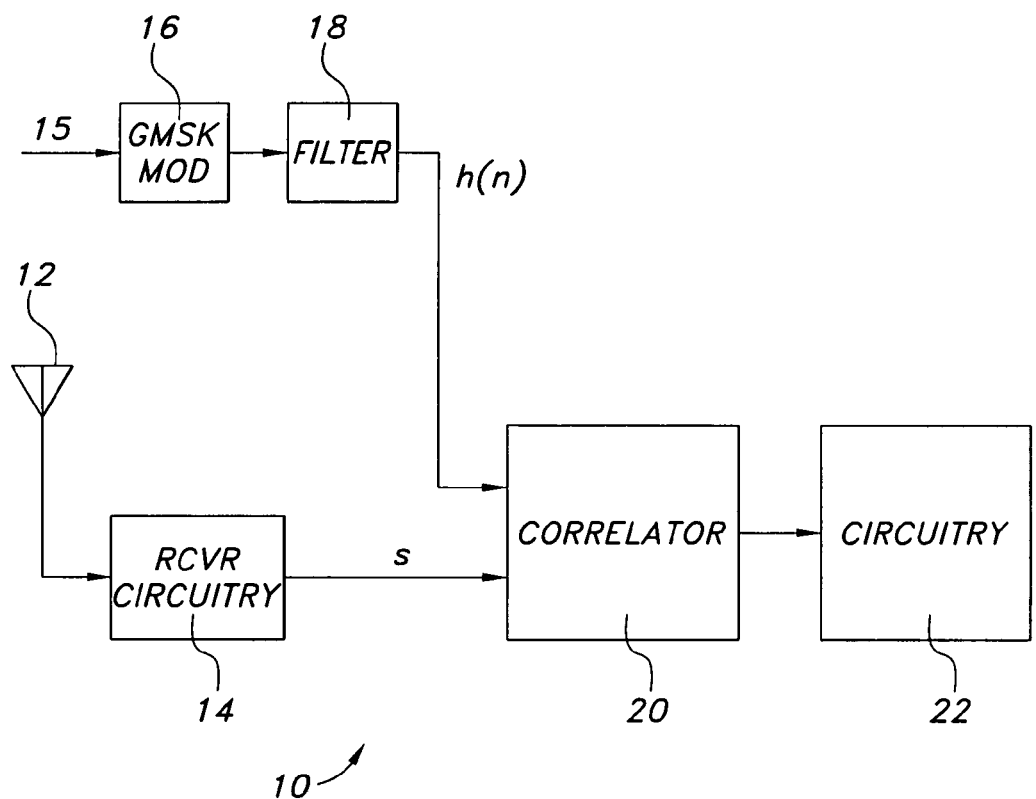
FIG. 1 is a schematic diagram of a receiver according to the invention.
Figure 2:
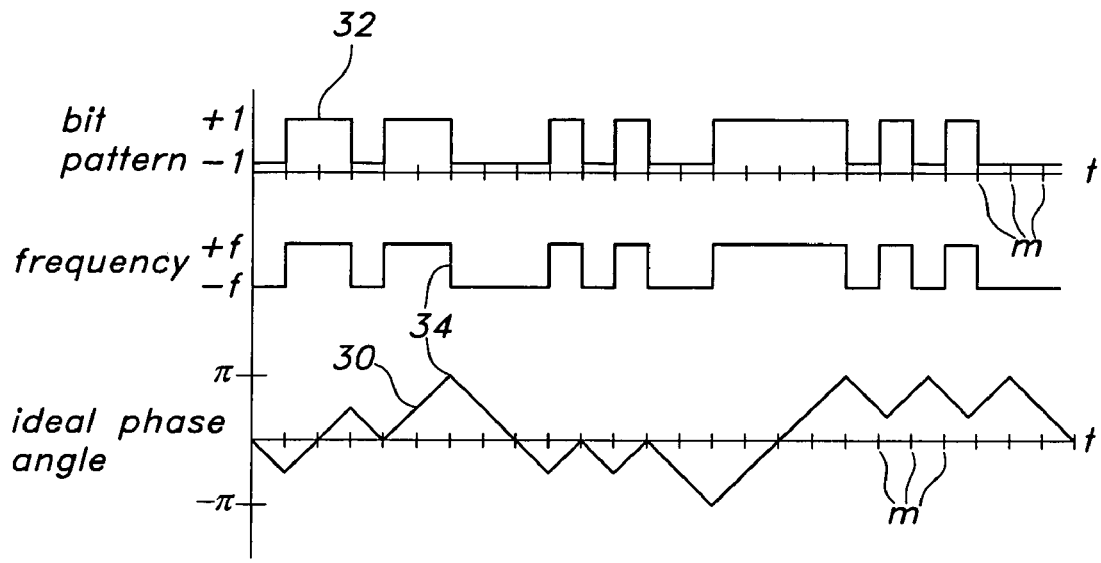
FIG. 2 is a graph showing MSK frequency and phase angle changes in response to changes in a bit pattern.
Figure 3:
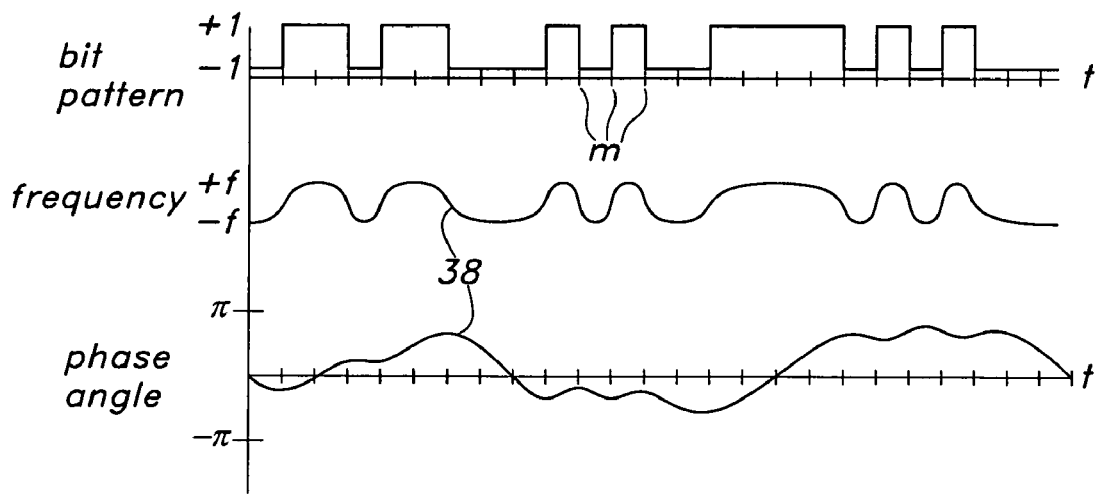
FIG. 3 is a graph showing GMSK frequency and phase angle changes in response to changes in the same bit pattern as that of FIG. 2.

FIG. 1 is a schematic diagram of a wireless communications receiver 10 configured to receive and process phase modulated signals such as GMSK. Receiver 10 includes an antenna 12 and associated receiver circuitry 14, which performs functions such as downconversion, filtering, and amplification of a received signal s. The received signal s preferably includes a synchronization portion that supplies a signal pattern, or bit sequence, known to both the sender (not shown) and receiver 10. A synchronization (synch) key 15, which represents the known signal pattern, is input into a GMSK modulator 16 to modulate the known pattern to approximate the characteristics of the incoming GMSK signal. The modulated synch key 15 is filtered by a receive matched filter 18. The output of filter 18 is a synchronization (synch) pattern h(n) that is sent, along with the received signal s, to a correlator 20. The correlator includes circuitry and/or logic elements that compare the received signal s with the synch pattern h(n) to determine whether the received signals adequately correspond to the synch pattern. If so, the correlator sends the received signal to other circuitry 22, such as a decoder, for further processing. Receiver 10 may form an integral or functional part of a communications transceiver, or alternatively may be a stand-alone receiver.

As previously discussed, Gaussian Minimum Shift Keying (GMSK) provides at least a partial solution to the frequency discontinuities inherent in MSK techniques. GMSK techniques round off each frequency change with a Gaussian filter and thereby reduces the utilized bandwidth. A method of calculating a correlation between an incoming signal and a synch pattern is expressed by $$C(n) = \sum_{k=0}^{N-1} s(n+k) h^*(k)$$

where s(n) is the incoming signal, and h(n) is the synch pattern to match. The synch pattern h(n) for a GMSK correlator can be computed by running the known synchronization bit sequence, or synch key, through GMSK modulator 16 and filter 18 to compute a synch pattern signal, which may be expressed as $$h(k) = \text{GMSK\_MOD}(t(k))$$

This expression of the synch pattern function is itself a function of the value of the input bit pattern, where t(k) is ±1.

The correlation function can be further expressed by breaking up the signal s(n) and synch pattern h(n) into their in-phase and quadrature components:

$$C(n) = \sum_{k=0}^{N-1} (s_i(n+k) + js_q(n+k))(h_i(k) - jh_q(k))$$

However, each sum requires four multiplication operations: $s_i \cdot h_i$, $s_i \cdot h_q$, $s_q \cdot h_i$, and $S_q \cdot h_q$. To reduce the number of multiplication operations, a method is used which eliminates the computation of h(n) and also eliminates the non-trivial multiplication operations, such as $s_i \cdot h_i$. Specifically, h'(k) is derived directly from the value of the input bit pattern t(k), where t(k)=+1 or −1.

h'(k)=t(k) when k is even, and h'(k)=jt(k) when k is odd.

The correlation function can therefore be expressed as $$C(n) = \sum_{k=0}^{N-1} s(n+k) h'^*(k) \text{ or}$$

$$C(n) = \sum_{k=0}^{N/2-1} s(n+2k) \cdot t(2k) - j \sum_{k=0}^{N/2-1} s(n+2k+1) \cdot t(2k+1) \text{ or}$$

$$C(n) = \sum_{k=0}^{N/2-1} [s_i(n+2k) + js_q(n+2k)] \cdot t(2k) -$$
$$j \sum_{k=0}^{N/2-1} [s_i(n+2k+1) + js_q(n+2k+1)] \cdot t(2k+1)$$

Figure 4:
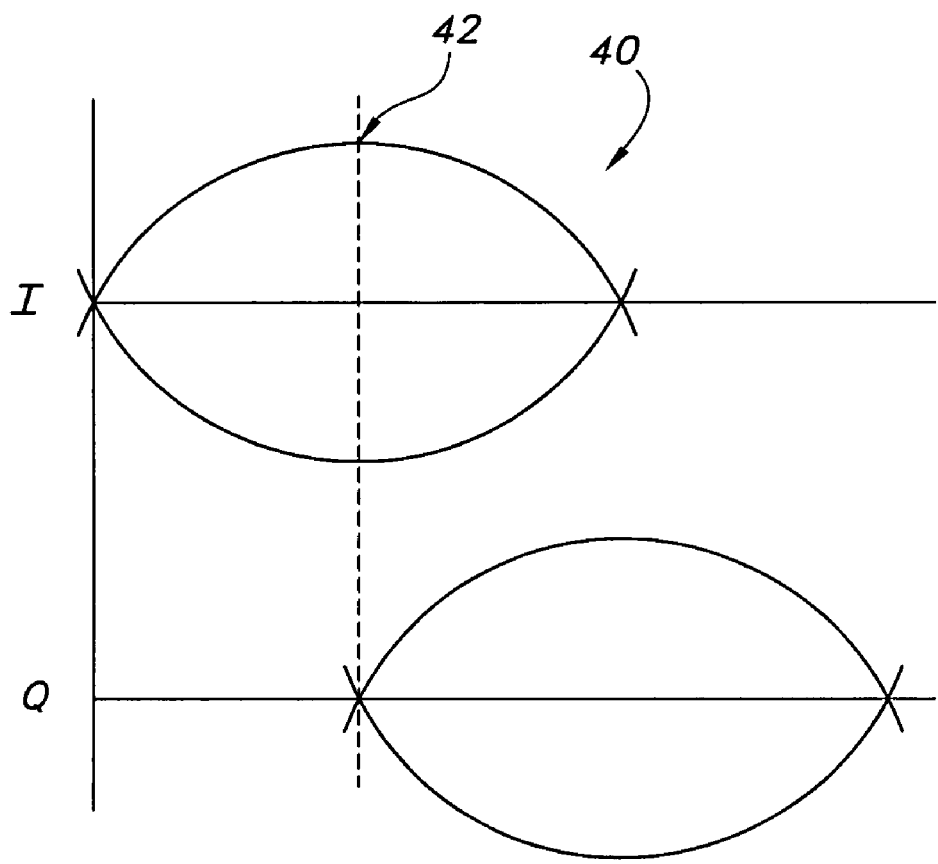
FIG. 4 is a combined in-phase and quadrature eye diagram of an ideal MSK signal.

Since t(k)=+1 or −1, there are no multiplication operations necessary to perform the correlation; only trivial addition and subtraction operations are required. However, because of the GMSK modulation and the resultant rounding of the frequency signal, the values of synch pattern h'(k) at the symbol tap times m are only a rough approximation of the synch pattern h(k). As previously explained, GMSK techniques suffer from inherent intersymbol interference. FIG. 4 depicts eye diagrams of the in-phase and quadrature components of an ideal MSK signal 40. The phase angle at which the MSK eye diagram is widest (i.e., 90 degrees and integer multiples thereof), identified by reference number 42, is typically the point where the most effective correlation computations can be obtained. However, the eye diagrams of the in-phase and quadrature components of a GMSK signal 44 (FIGS. 5A and 5B, respectively) show that at phase angles ideal for MSK signals (at reference number 46), the ideal GMSK signal does not provide a predictable maximum opening. This demonstrates that GMSK signals are inherently susceptible to intersymbol interference at the phase angles of 0, 90, 180, and 270 degrees, said interference being usually in the neighborhood of 2-3 dB. Consequently, when a GMSK signal is correlated at the symbol tap times m as MSK signals are, correlation computations are adversely affected. This can be seen in FIG. 7, which is a phase representation of GMSK signal 44 taken at point 46 in FIGS. 5A and 5B. Correlating the GMSK signal at point 46, which represents the phase angle at the symbol tap times, provides an inherent wide variation in phase angle, shown at 49a and 49b, from the ideal on-symbol phase angle 50. Such wide variation inhibits accurate signal correlation.

The invention solves this problem by noting that although the ideal GMSK signal has inherent intersymbol interference at phase angles of 0, 90, 180 and 270 degrees, the GMSK signal also displays predictable convergence, or minimal intersymbol interference, at other phase angles. The point of predictable convergence is shown in the eye diagrams of GMSK signal 44 (FIGS. 5A and 5B) as a region where the overlaid GMSK signals converge to a point 48 of minimum variation. The point of predictable convergence is located at phase angles of 45, 135, 225, and 315 degrees, which correspond to data samples taken halfway between the symbol tap times m. FIG. 6 depicts a bit pattern and the associated phase angle portion of the GMSK signal, showing the points p halfway between the symbol tap times where, according to the invention, data for correlation purposes can be obtained while minimizing intersymbol interference.

A modified improved synch pattern signal is mathematically defined as h"(k)=t(k)+jt(k+1) when k is even, and h"(k)=t(k+1)+jt(k) when k is odd.

The new correlation equation is then expressed as $$C(n) = \sum_{k=0}^{N-2} s(n+k)h'''^*(k) \text{ or}$$

$$C(n) = \sum_{k=0}^{N/2-1} s(n+2k) \cdot (t(k) - jt(k+1)) +$$

$$j \sum_{k=0}^{N/2-2} s(n+2k+1) \cdot (t(2k+2) - jt(2k+1))$$

Because the invention uses off-symbol samples, the GMSK samples between the symbol tap times m, and the total number of samples is reduced by 1. Also, as previously mentioned, no non-trivial multiplication operations are required since t(k)=+1 or −1.

Figure 5A:
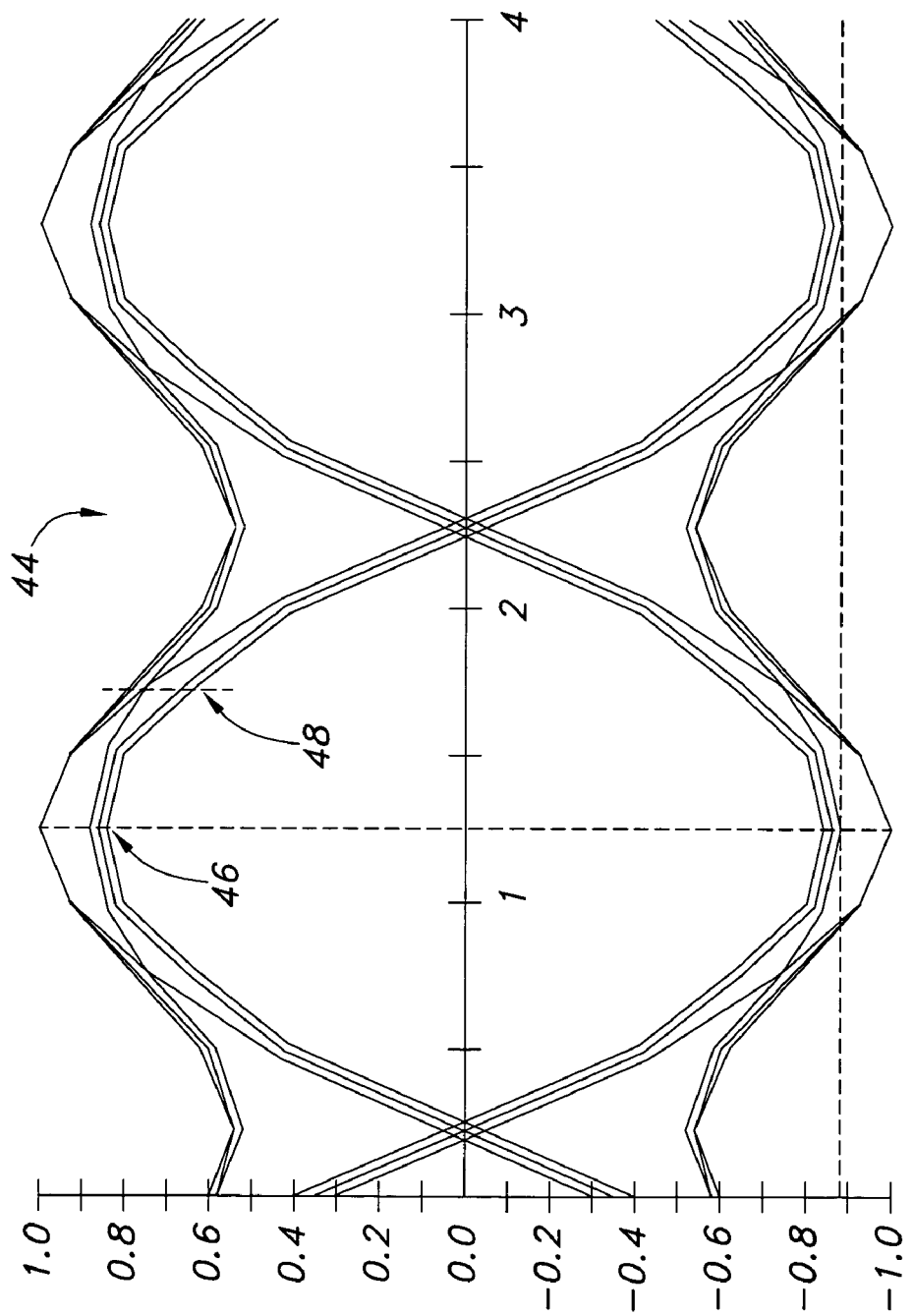
FIG. 5A is an eye diagram of the in-phase portion of a GMSK signal.
Figure 5B:
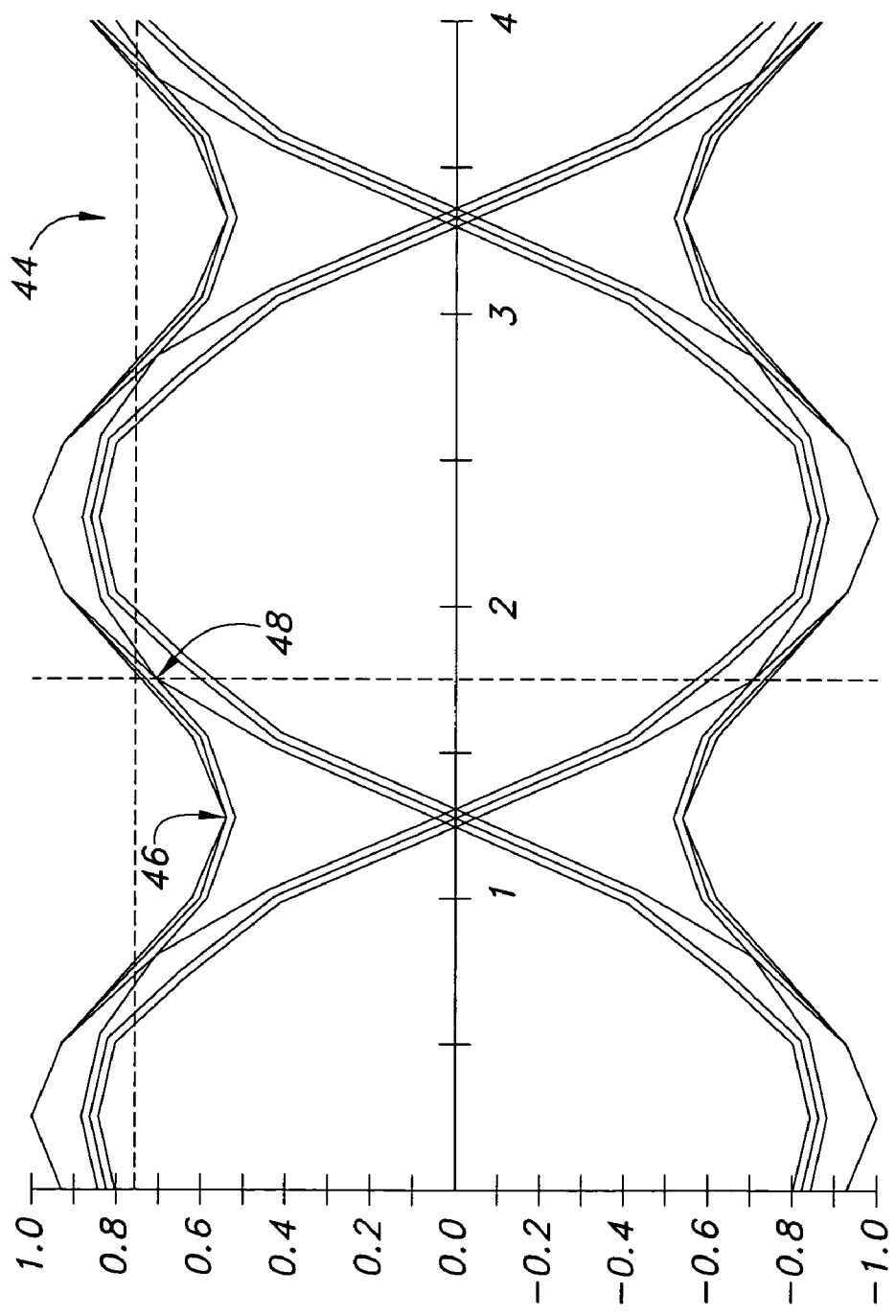
FIG. 5B is an eye diagram of the quadrature portion of a GMSK signal.
Figure 6:
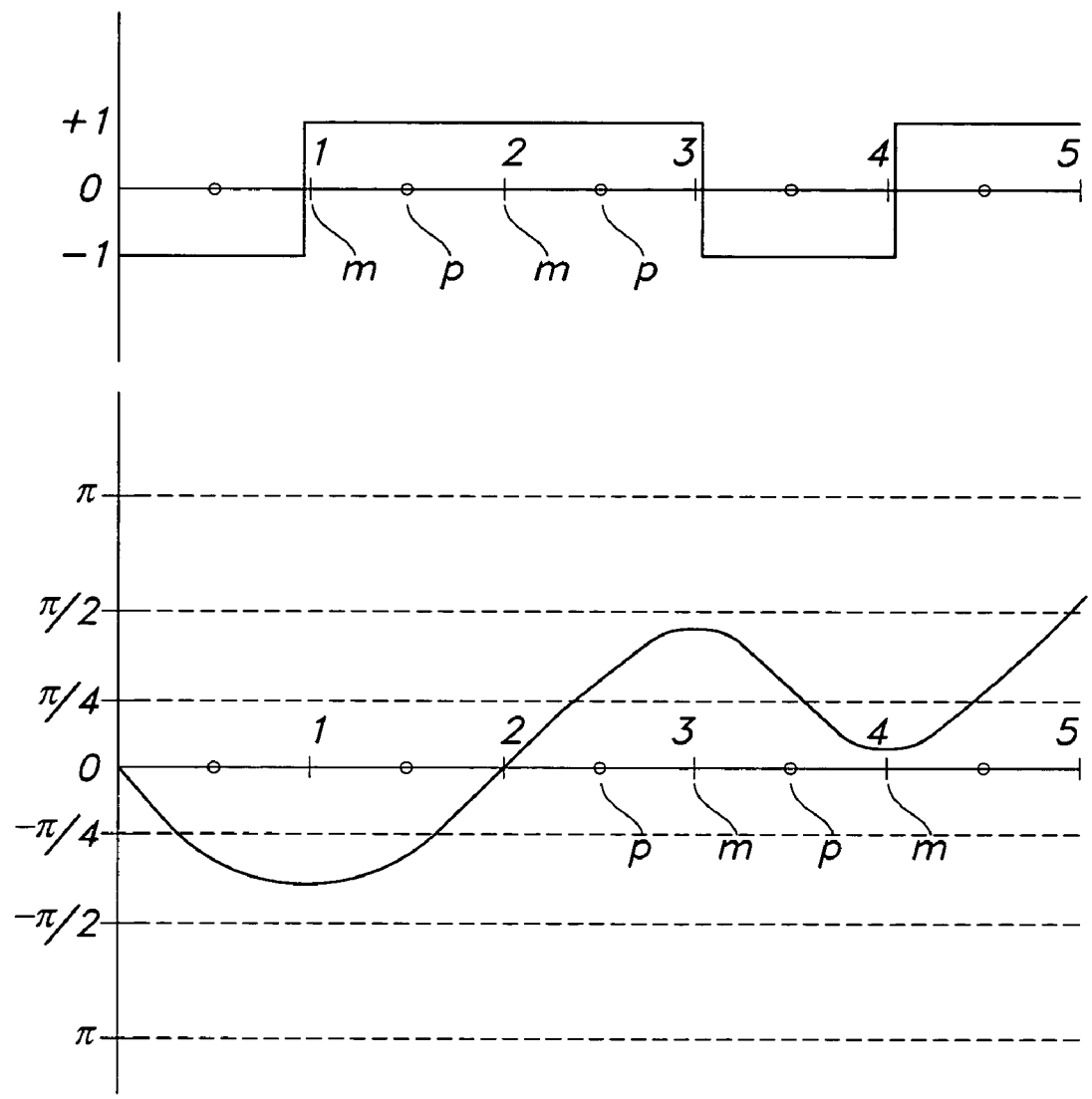
FIG. 6 is a graph showing GMSK phase angle changes and correlation sample points according to the invention.
Figure 7:
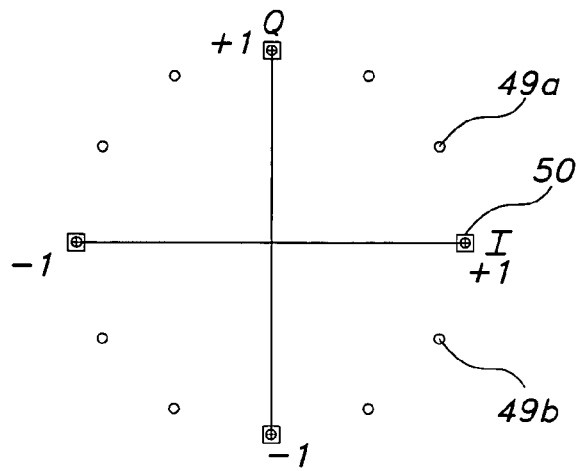
FIG. 7 is a phase representation of the in-phase and quadrature eye diagrams at a first point in FIGS. 5A and 5B.
Figure 8:
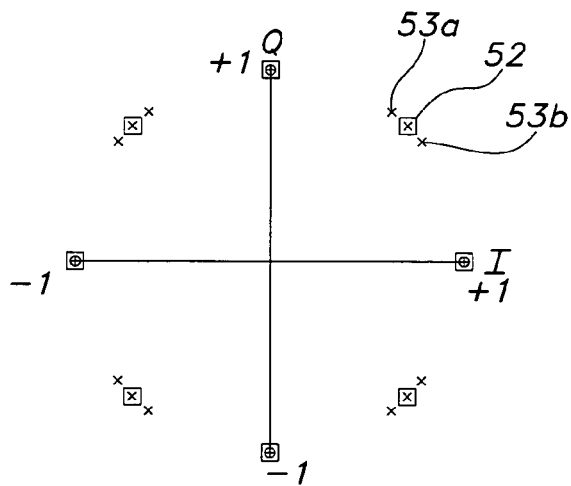
FIG. 8 is a phase representation of the in-phase and quadrature eye diagrams at a second point in FIGS. 5A and 5B.

The advantage of implementing such an off-symbol or off-pulse correlation technique may be shown by referring to FIG. 8, which is a phase representation of the in-phase and quadrature components of point 48 on the eye diagrams in FIGS. 5A and 5B. The ideal off-symbol phase is represented by point 52, and the phase variability is shown by points 53a and 53b. It can be seen that the difference between ideal off-symbol phase angle 52 and the variability 53a/b is much smaller than the difference between the ideal on-symbol phase angle 50 and its respective variability 49a/b (FIG. 7). The invention therefore reduces GMSK phase angle variability due to inherent intersymbol interference.

Figure 9:
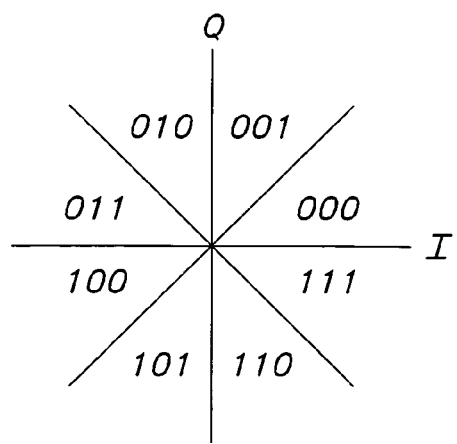
FIG. 9 is an I/Q diagram showing a quantization technique that may be used with the invention.

The invention may be advantageously used with phase quantization techniques. FIG. 9 is an I/Q diagram showing one potential phase quantization mapping technique where the I/Q domain is divided into eight equal regions. Each region is assigned a three bit phase representation such as 000, 001, 010, etc. A signal falling into one of the regions is assigned the respective three-bit representation, which may then be used in correlating the synch pattern to the incoming signal according to known correlation techniques.

Although the invention has been described in the context of Gaussian Minimum Shift Keying waveforms, the invention may be advantageously be used with other Continuous Phase Modulation (CPM) waveforms where intersymbol interference is desired to be minimized, or even with MSK waveforms into which intersymbol interference is introduced by the receiver equipment.

An advantage of the invention is that a complex waveform such as GMSK may be correlated with a known synchronization pattern while reducing or eliminating the intersymbol interference inherent in such a waveform.

Another advantage is that the mathematical operators required to determine a correlation are based upon simple additions and subtractions of the value of the bit pattern at known symbol tap times. This significantly reduces the computation time necessary to determine a correlation between a received signal and a known synchronization pattern.

Still another advantage is that the invention maximizes correlator performance under stringent phase quantization requirements. The invention can represent off-symbol points accurately due to their predictability, as noted in the eye diagrams.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of correlating a signal to a synchronization pattern, the signal having a waveform with frequency and phase angle components that may be varied, at each repeated signal pulse, to communicate a change in a bit pattern of the signal, the method comprising:

generating a synchronization pattern using a synchronization key;

comparing the signal to the synchronization pattern according to a correlator function C(n) defined as $$C(n) = \sum_{k=0}^{N-2} s(n+k)h''(k)$$

where s(n) is the signal,

N is a number of signal pulses in the synchronization pattern to be used in said correlator function, h"(k) is the synchronization pattern having a value of t(k)+jt(k+1) when k is even and t(k+1)+jt(k) when k is odd, and t(k) is a function expressing a value of the bit pattern of the signal having a value of one of +1 and −1; and determining whether the comparison of the signal and the synchronization pattern indicate a correlation between the signal and the synchronization pattern.

2. The method of claim 1, wherein said determining includes phase quantizing the signal to determine said correlation.

3. The method of claim 1, wherein the phase quantizing is octant quantizing.

4. The method of claim 1, wherein the waveform is a Continuous Phase Modulation (CPM) waveform.

5. The method of claim 4, wherein the waveform is a Gaussian Minimum Shift Key (GMSK) waveform.

6. The method of claim 4, wherein the waveform is a Minimum Shift Key (MSK) waveform.

7. A method of correlating a signal to a synchronization pattern, the signal having a waveform with frequency and phase angle components that may be varied, at each repeated signal pulse, to communicate a chance in a bit pattern of the signal, the method comprising:

generating a synchronization pattern using a synchronization key;

comparing the signal to the synchronization pattern according to a correlator function C(n) defined as $$C(n) = \sum_{k=0}^{N/2-1} s(n+2k) \cdot (t(k) - jt(k+1)) + j \sum_{k=0}^{N/2-2} s(n+2k+1) \cdot (t(2k+2) - jt(2k+1))$$

where
s(n) is the signal,
N is a number of signal pulses in the synchronization pattern to be used in said correlator function, and
t(k) is a function expressing a value of the bit pattern of the signal having a value of one of +1 and −1: and
determining whether the comparison of the signal and the synchronization pattern indicate a correlation between the signal and the synchronization pattern.

8. A correlator that correlates a signal to a synchronization pattern, the signal having a waveform with frequency and phase angle components that may be varied, at each repeated signal pulse, to communicate a change in a bit pattern of the signal, the correlator comprising:

means for generating a synchronization pattern using a synchronization key;

means for comparing the signal with the synchronization pattern according to a correlator function C(n) defined as $$C(n) = \sum_{k=0}^{N/2-1} s(n+2k) \cdot (t(k) - jt(k+1)) + j \sum_{k=0}^{N/2-2} s(n+2k+1) \cdot (t(2k+2) - jt(2k+1))$$

where
s(n) is the signal,
N is a number of signal pulses in the synchronization pattern to be used in said correlator function, and
t(k) is a function expressing a value of the bit pattern of the signal having a value of one of +1 and −1; and
means for determining whether the comparison of the signal and the synchronization pattern indicate a correlation between the signal and the synchronization pattern.

9. The correlator of claim 8, wherein the waveform is a Continuous Phase Modulation (CPM) waveform.

10. The correlator of claim 8, wherein the waveform is a Minimum Shift Key (MSK) waveform.

11. The correlator of claim 8, further comprising means for phase quantizing the signal to determine said correlation.

* * * * *